US008495012B2

(12) United States Patent
Nagai et al.

(10) Patent No.: US 8,495,012 B2
(45) Date of Patent: Jul. 23, 2013

(54) SYSTEM AND METHOD FOR MANAGING ROOT FILE SYSTEM

(75) Inventors: Shingo Nagai, Kanagawa (JP); Nobuaki Takahashi, Tokyo (JP); Fumitomo Ohsawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/335,854

(22) Filed: Dec. 16, 2008

(65) Prior Publication Data
US 2009/0164840 A1   Jun. 25, 2009

(30) Foreign Application Priority Data
Dec. 19, 2007 (JP) ................... 2007-328047

(51) Int. Cl.
*G06F 7/00* (2006.01)
*G06F 11/00* (2006.01)

(52) U.S. Cl.
USPC ................ 707/610; 707/674; 714/2

(58) Field of Classification Search
USPC ....... 707/610, 674, 822, 821, 999.2, 999.201, 707/999.202; 714/2, 4.11
See application file for complete search history.

(56) References Cited

U.S. PATENT DOCUMENTS

| | | | | |
|---|---|---|---|---|
| 5,032,979 A * | 7/1991 | Hecht et al. | ...................... | 726/25 |
| 5,802,297 A * | 9/1998 | Engquist | ........................ | 709/212 |
| 6,144,999 A * | 11/2000 | Khalidi et al. | ................. | 709/219 |
| 6,249,879 B1 * | 6/2001 | Walker et al. | .................... | 714/11 |
| 6,601,101 B1 * | 7/2003 | Lee et al. | ....................... | 709/227 |
| 6,718,352 B1 * | 4/2004 | Dang et al. | ............. | 707/999.205 |
| 6,931,558 B1 * | 8/2005 | Jeffe et al. | ...................... | 713/340 |
| 7,383,463 B2 * | 6/2008 | Hayden et al. | ............... | 714/4.11 |
| 7,769,779 B2 * | 8/2010 | Havens et al. | ................. | 707/783 |
| 7,809,693 B2 * | 10/2010 | Lango et al. | .................... | 707/679 |
| 7,908,339 B2 * | 3/2011 | Keith, Jr. | ........................ | 709/217 |
| 7,958,101 B1 * | 6/2011 | Teugels et al. | ................ | 707/705 |
| 8,176,094 B2 * | 5/2012 | Friedman | ..................... | 707/803 |
| 2001/0047482 A1 * | 11/2001 | Harris et al. | ................... | 713/200 |

(Continued)

FOREIGN PATENT DOCUMENTS

| | | |
|---|---|---|
| JP | 8328912 | 12/1996 |
| JP | 9034825 | 2/1997 |

(Continued)

OTHER PUBLICATIONS http://linfo.org/root_filesystem.html., Root filesystem defininition by the Linux Information Project, Apr. 18, 2006.

(Continued)

*Primary Examiner* — Robert Timblin
(74) *Attorney, Agent, or Firm* — Yuanmin Cai (57) ABSTRACT

There is provided a system including a cluster 11, a cluster 12 and an image server 20. A host 101a constituting the cluster 11 has a root file system 111a used to operate the host 101a in a local disk. The image server 20 has a root file system 221a used to operate the host 101a, and the host 101a virtually constructs a root file system 121a by mounting the root file system 221a. When the root file system 111a is varied, the host 101a synchronizes the root file system 111a with the root file system 121a. The same applies to host 102a constituting the cluster 12.

11 Claims, 11 Drawing Sheets

U.S. PATENT DOCUMENTS

| | | | |
|---|---|---|---|
| 2002/0065840 A1* | 5/2002 | McBrearty et al. | 707/202 |
| 2003/0084368 A1* | 5/2003 | Sprunt et al. | 714/5 |
| 2003/0126242 A1* | 7/2003 | Chang | 709/222 |
| 2003/0237019 A1* | 12/2003 | Kleiman et al. | 714/6 |
| 2004/0083357 A1* | 4/2004 | Duncan et al. | 713/2 |
| 2004/0162955 A1* | 8/2004 | Jones et al. | 711/162 |
| 2006/0136904 A1* | 6/2006 | Weidman et al. | 717/172 |
| 2007/0050675 A1* | 3/2007 | Yu | 714/36 |
| 2007/0094489 A1* | 4/2007 | Ota et al. | 713/2 |
| 2008/0288506 A1* | 11/2008 | Brown | 707/10 |

FOREIGN PATENT DOCUMENTS

| | | |
|---|---|---|
| JP | 2001109642 A | 4/2001 |
| JP | 2004178596 | 6/2004 |
| JP | 2006154935 | 6/2006 |
| JP | 2007200294 A | 8/2007 |
| JP | 2008276281 A | 11/2008 |
| WO | WO2009069326 | 6/2009 |

OTHER PUBLICATIONS

Information Materials for IDS dated Aug. 3, 2012; Application No. JP920070159JP1, JPO Office Action Jul. 31, 2012, Prepared by Mio Motomura.

* cited by examiner

SYSTEM AND METHOD FOR MANAGING ROOT FILE SYSTEM

CROSS REFERENCE TO RELATED APPLICATION

The present application claims the benefit of priority of a Japanese Patent Application No. 2007-328047, filed Dec. 19, 2007 with the Japan Patent Office, the content of which is incorporated herein by reference in its entirety.

FIELD OF THE INVENTION

The present invention relates to system and method for managing root file system, and more particularly to system and method for managing root file system used to operate a computer.

BACKGROUND

In recent years, in the field of cluster system which combines multiple computers into a group, diskless cluster is attracting attention wherein individual computers constituting the cluster system contain no disk. In such a diskless cluster, root file systems of each computer are managed by an image server. These root file systems are mounted in each computer, whereby the computers are operated.

Diskless operation facilitates the management of each computer. However, when the image server has too much traffic, performance of the system degrades.

Therefore, for systems where performance has priority, there has been proposed an operation using a local hard disk drive (e.g., refer to Patent Document 1, Published Unexamined Japanese Patent Application No. 9-034825). In a client-server configuration as being illustrated in FIG. 3 of Patent Document 1, each client includes a local root file memory which stores a copy of local root file system from the root file memory connected to a server.

Also for a diskless computer, there are: a technique (e.g., refer to Patent Document 2, Published Unexamined Japanese Patent Application No. 8-328912) by which stack and register contents are sent and saved as a core image to a remote server when a failure occurs in the application; and a technique by which a local non-volatile memory cache is used when the network cannot be used temporarily or is low in data transmission speed, and the memory cache is synchronized with the storage volume of the server after the status of network has been improved (e.g., refer to Patent Document 3, Published Unexamined Japanese Patent Application No. 2004-178596).

However, in the operation of using local hard disk drive as being illustrated in Patent Document 1, failures may occur in the local hard disk drive. When a failure occurs, a new hard disk drive must be prepared and used to restore, or reconstruct, the system environment, which requires time and labor.

In addition, when a failure of the hard disk drive occurs during execution of an application, it is difficult to change back the application state to the pre-failure state.

SUMMARY OF PREFERRED EMBODIMENTS

An object of the present invention is to swiftly change the operation using a local disk of computer to a diskless operation when a failure occurs in the local disk. Another object of the present invention is to easily change back the operating state of a computer to the pre-failure state when a failure occurs during operation of the computer.

To achieve the above objects, one embodiment of the present invention provides a system which manages a root file system used to operate a computer. The system includes: a client which has a primary root file system used to operate the client in a local disk; and a server which has a secondary root file system used to operate the client when a failure occurs in the local disk, wherein when the primary root file system is varied, the client synchronizes contents of a varied part of the primary root file system with contents of a corresponding part of the secondary root file system.

Also, in this system, when a failure occurs in the local disk, based on the secondary root file system provided in the server, the client may construct the primary root file system on another local disk where no failure has occurred.

Further, in this system, the client may output state information indicating the own operating state into the primary root file system and the secondary root file system. In this case, the state information may include check point information indicating the operating state of at least one of an operating system and an application running in the client, and the client may output the check point information based on a check point policy which defines at least one of a check point information acquisition source, an acquisition time, the number of versions to be outputted and an output destination.

Furthermore, in this system, when the client operates using the secondary root file system as a result of occurrence of a failure in the local disk, the client may restore the pre-failure operating state based on the state information outputted into the secondary root file system. In this case, the state information may include check point information indicating the operating state of at least one of the operating system and application running in the client, and the client may restore the pre-failure operating state based on a recovery policy which defines at least one of the applicability of check point information, a version to be applied and a read source.

Also, the present invention provides a computer operating by use of a root file system, the computer includes: a storage unit which stores a primary root file system used to operate the computer; a mounting unit which mounts a secondary root file system used to operate the computer when a failure occurs in the storage unit, from another computer having the secondary root file system; and a synchronization process unit which, upon the primary root file system being varied, synchronizes the contents of a varied part of the primary root file system with the contents of a corresponding part of the secondary root file system mounted by the mounting unit.

Another embodiment of the present invention provides a method for managing a root file system used to operate a computer. The method includes: operating a client by use of a primary root file system constructed in a local disk of the client; mounting a secondary root file system used to operate the client when a failure occurs in the local disk, from a server having the secondary root file system to the client; and upon the primary root file system being varied, synchronizing the contents of a varied part of the primary root file system with the contents of a corresponding part of the mounted secondary root file system.

According to embodiments of the present invention, an operation using a local disk of computer can be swiftly changed to a diskless operation when a failure occurs in the local disk.

DESCRIPTION OF SYMBOLS

10 . . . Host
20 . . . Image server
31 . . . Storage unit
32 . . . Boot unit
33 . . . OS activation unit
34 . . . Communication unit
35 . . . Mounting unit
36 . . . Synchronization process unit
37 . . . Check point acquisition unit
38 . . . Recovery process unit Various embodiments of the present invention will be described in detail below with reference to the accompanying drawings.

DETAILED DESCRIPTION OF PREFERRED EMBODIMENTS

First, to illustrate various embodiments of the present invention, configuration of a demonstrative diskless cluster system will be described below.

Figure 1:
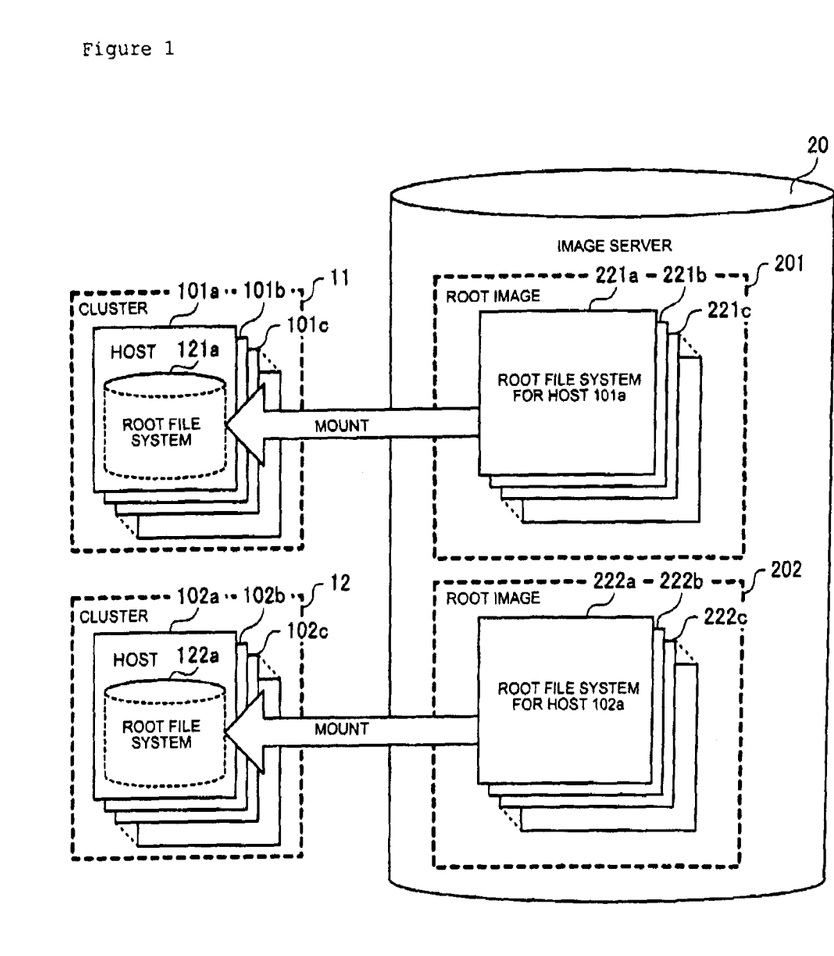
FIG. 1 is a view illustrating a configuration of a typical diskless cluster system being an assumption for an embodiment of the present invention.

FIG. 1 illustrates a typical system configuration when a diskless cluster is operated. This system includes a cluster 11, cluster 12 and image server 20.

The cluster 11 is constituted of hosts 101a, 101b, 101c, . . . ; the cluster 12 is constituted of hosts 102a, 102b, 102c, . . . ; each host is connected via a network (not illustrated) to the image server 20.

In the image server 20, a root file system image 201 used to operate each host in the cluster 11 and a root file system image 202 used to operate each host in the cluster 12 are managed in a centralized manner. Here, the root file system image 201 is a file obtained by compressing a root file system 221a of the host 101a, a root file system 221b of the host 101b, a root file system 221c of the host 101c, . . . ; the root file system image 202 is a file obtained by compressing a root file system 222a of the host 102a, a root file system 222b of the host 102b, a root file system 222c of the host 102c, . . . .

In the system having the above configuration, the root file systems 221a, 221b and 221c are mounted in the hosts 101a, 101b, 101c, . . . , respectively, whereby root file systems 121a, 121b, 121c are virtually constructed. As a result, the hosts 101a, 101b, 101c, . . . can operate diskless. Also, the root file systems 222a, 222b and 222c are mounted in the hosts 102a, 102b, 102c, . . . , respectively, whereby root file systems 122a, 122b, 122c are virtually constructed. As a result, the hosts 102a, 102b, 102c, . . . can operate diskless.

However, while such diskless operation facilitates the management of the hosts in the cluster, the performance lowers when the image server 20 has too much network traffic.

When the diskless cluster operation is difficult to be implemented from a viewpoint of performance, an operation using the root file system constructed in a local hard disk drive (hereinafter referred to as "local disk") is possible. However, in the operation using the local disk, a failure of the hard disk drive must be considered.

Thus, according to the present embodiment, the following system configuration is used.

Figure 2:
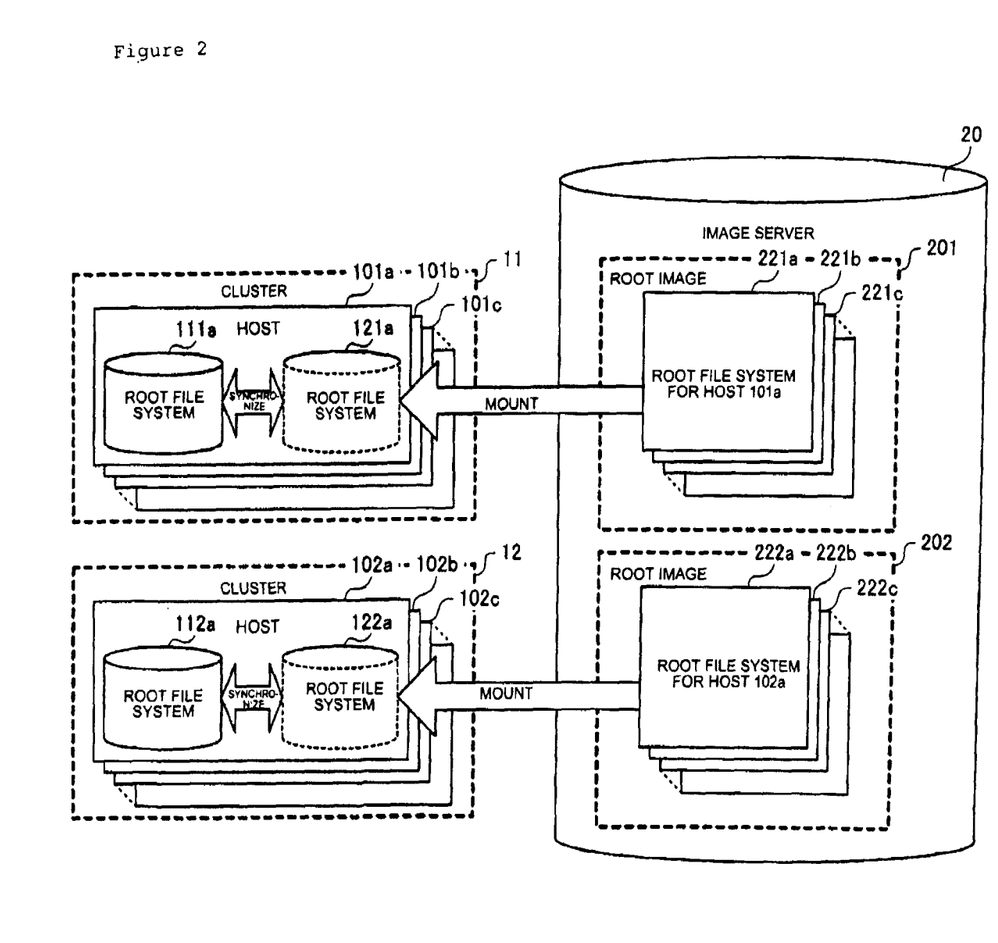
FIG. 2 is a view illustrating cluster system configuration according to the present embodiment of the present invention when a failure of hard disk drive is considered.

FIG. 2 illustrates a cluster system configuration according to the present embodiment when a failure of hard disk drive is considered.

This system includes, similarly to the system configuration illustrated in FIG. 1, the cluster 11, cluster 12 and image server 20. Further, similarly to the system configuration illustrated in FIG. 1, the cluster 11 is constituted of hosts 101a, 101b, 101c, . . . ; the cluster 12 is constituted of hosts 102a, 102b, 102c, . . . ; each host is connected via a network (not illustrated) to the image server 20; in the image server 20, the root file system image 201 used to operate each host in the cluster 11 and the root file system image 202 used to operate each host in the cluster 12 are managed in a centralized manner.

Referring to FIG. 2, however, differently from the system configuration illustrated in FIG. 1, root file systems 111a, 111b, 111c, . . . are constructed on local disks of the hosts 101a, 101b, 101c, . . . , respectively. In addition, root file systems 221a, 221b, 221c, . . . are mounted in the hosts 101a, 101b, 101c, . . . , whereby root file systems 121a, 121b, 121c, . . . are virtually constructed. Also, root file systems 112a, 112b, 112c, . . . are constructed on local disks of the hosts 102a, 102b, 102c, . . . , respectively. In addition, root file systems 222a, 222b, 222c, . . . are mounted in the hosts 101a, 101b, 101c, . . . , whereby root file systems 122a, 122b, 122c, . . . are virtually constructed. And as indicated by the arrow between the root file systems 111a and 121a in FIG. 2, these root file systems are synchronized at all times. Similarly, the root file systems 112a and 122a are synchronized at all times.

According to the present embodiment, each host is provided as an exemplary client; the image server 20 is provided as an exemplary server; the root file systems on each host are used as an exemplary primary root file system; and the root file systems on the image server 20 are used as an exemplary secondary root file system.

That is, according to the present embodiment, in the cluster system which is usually operated using the local disk, duplexing is implemented using the root file system constructed on the local disk and the root file system constructed on the image server 20. And the contents of these root file systems are synchronized at all times. Consequently, when a failure occurs in the local disk, the system outage time period can be minimized; a switchover can be swiftly made to a diskless operation, so that the operation is restarted under the identical system environment.

Also, according to the present embodiment, check point information and the like of the system and application are saved into the root file system on the local disk and into the root file system on the image server 20, and these are synchronized. Accordingly, it is possible to restore the pre-failure system and application state. In this case, according to the present embodiment, it is also possible to carry out, based on a preliminarily set policy, the saving of check point information or the restoring of the pre-failure state.

Here, the check point policy is one which defines: a list of applications being check point information acquisition sources; the timing (for example, every x minutes) at which check point information is acquired or saved; the number of generations of check point information to be saved (the number of versions of check point information to be saved); and the output destination of a file having stored therein check point information.

Recovery policy is one which defines: whether to apply check point information when the pre-failure state is restored; if so, a site (read source) where check point information to be applied is saved, and a specific generation of check point information before the current generation to be applied (a version of check point information to be applied).

According to the present embodiment, such check point policy and recovery policy can be set for each host.

Alternatively, a policy may be shared by multiple hosts which operate the identical application under the identical environment, for example, by hosts constituting the same cluster.

Figure 3:
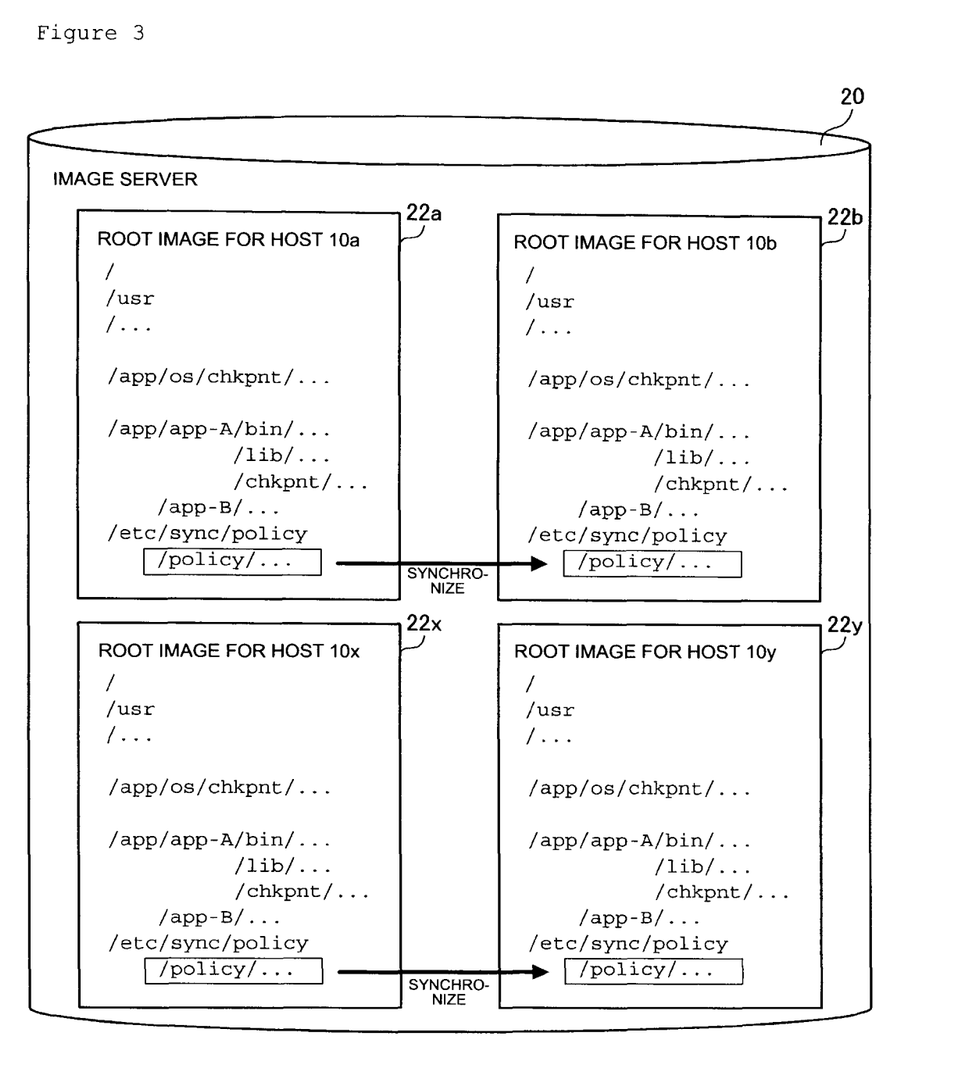
FIG. 3 is a view for explaining a process by which check point policy and recovery policy are shared by multiple hosts according to the present embodiment of the present invention.

FIG. 3 illustrates a process by which check point policy and recovery policy are shared by multiple hosts. Here, consider a case where hosts 10*a*, 10*b*, 10*x* and 10*y* are connected to the image server 20.

In this case, the image server 20 stores a root file system image 22*a* for the host 10*a*, a root file system image 22*b* for the host 10*b*, a root file system image 22*x* for the host 10*x* and a root file system image 22*y* for the host 10*y*.

Here, assume that in "/policy" immediately below directory "/etc" in root file systems in each root file system image, there is defined, for example, several operation patterns of each application, and in "/etc/sync/policy", there is defined, for example, a specific operation pattern of the several patterns to be followed by each application. In such a case, since the operation patterns of each application are identical to some extent among hosts under the identical environment, the patterns can be shared. Thus, referring to FIG. 3, as indicated by the rectangular frame, the part of "/policy" is shared by the hosts 10*a* and 10*b*, and the part of "/policy" is shared by the hosts 10*x* and 10*y*.

The operation according to the present embodiment will be described below. Here, the operation according to the present embodiment is divided into three operating modes (hereinafter "mode" for short) which will be described below.

The first mode is one in which the operation is performed while the root file system on the local disk and the root file system on the image server 20 are synchronized. Hereinafter, this mode is referred to as "ordinary operation mode".

The second mode is one in which the operation is performed by using only the root file system on the image server 20 when a failure occurs in the local disk. Hereinafter, this mode is referred to as "remote disk operation mode".

The third mode is one in which recovery is performed by the root file system on the image server 20 after preparation of a new hard disk is completed. Hereinafter, this mode is referred to as "recovery operation mode".

First, the operation of these three modes will be schematically described, and then described in detail. Before the detailed description of the operation, the function configuration of the host 10 will also be described. The above described hosts have the same function configuration, and thus when there is no need to distinguish between these, the hosts will be represented by "host 10".

1. Ordinary Operation Mode (Schematic Description of Operation)

Figure 4:
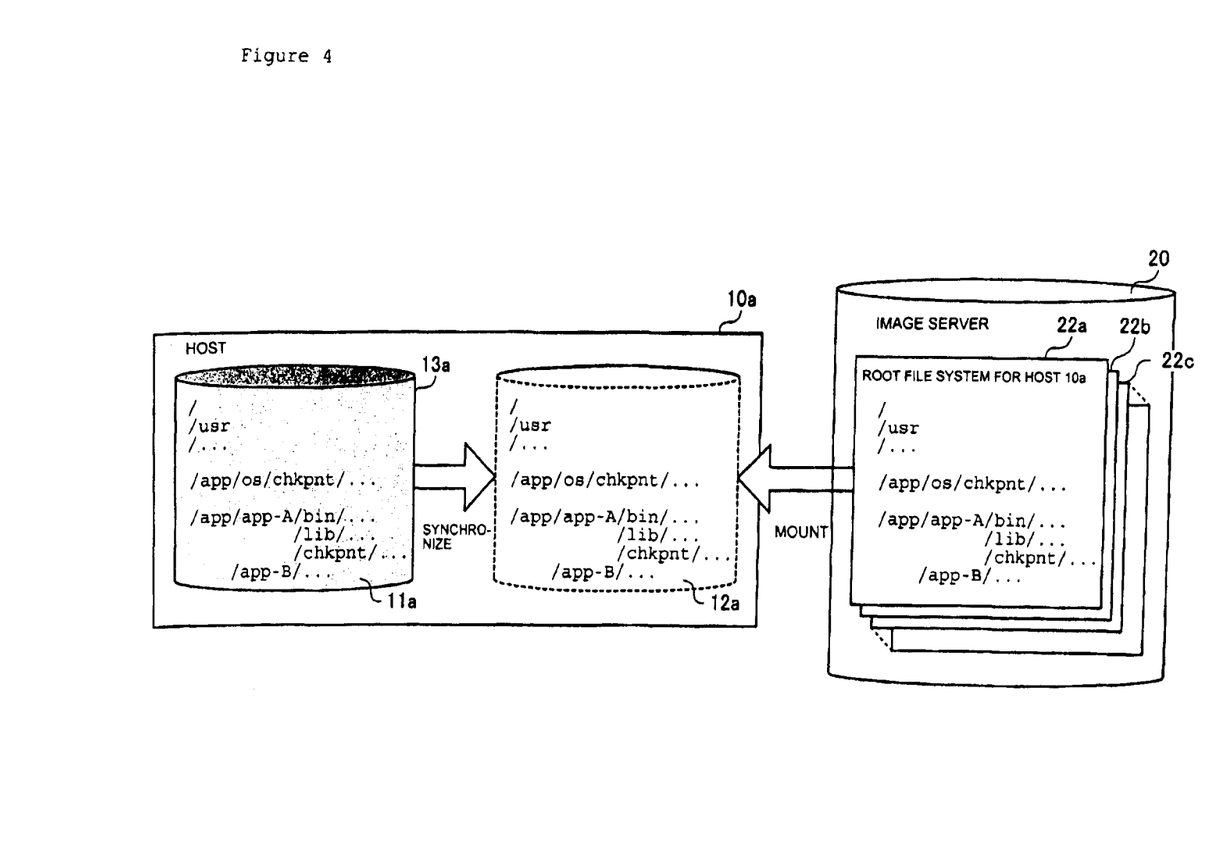
FIG. 4 is a view schematically illustrating the operation of a host in an ordinary operation mode according to the present embodiment of the present invention.

FIG. 4 is a view schematically illustrating the operation in this mode. Actually, multiple hosts 10 are connected to the image server 20, but in FIG. 4, of the hosts 10, the host 10*a* is considered.

First, the host 10*a* is activated using a boot image installed in a local disk 13*a*. Then, a root file system 11*a* on the local disk 13*a* is NFS (Network File System)-mounted (hereinafter "mount" for short), so that OS (Operating System) is operated.

Meanwhile, the host 10*a* remote-mounts a root file system 22*a* on the image server 20 to construct a virtual root file system 12*a*. Then, the root file system 11*a* on the local disk 13*a* and the root file system 22*a* on the image server 20 are synchronized, for example, at regular intervals, so that a switchover to the diskless operation is possible any time.

The host 10*a* saves based on a check point, check point information into the root file system 11*a* on the local disk 13*a* and/or the root file system 22*a* on the image server 20, for example, at regular intervals.

The above described operation in this mode is summarized as follows.

Firstly, in this mode, both the local disk 13*a* and the image server 20 (the root file system image for the host 10*a*) can be used. The boot image and root file system are present in both the local disk 13*a* and the image server 20. Further, the production method and output destination of check point information are determined based on check point policy. Here, the production method of check point information includes a list of applications for which check point information is produced, and a timing of producing check point information.

2. Remote Disk Operation Mode (Schematic Description of Operation)

Figure 5:
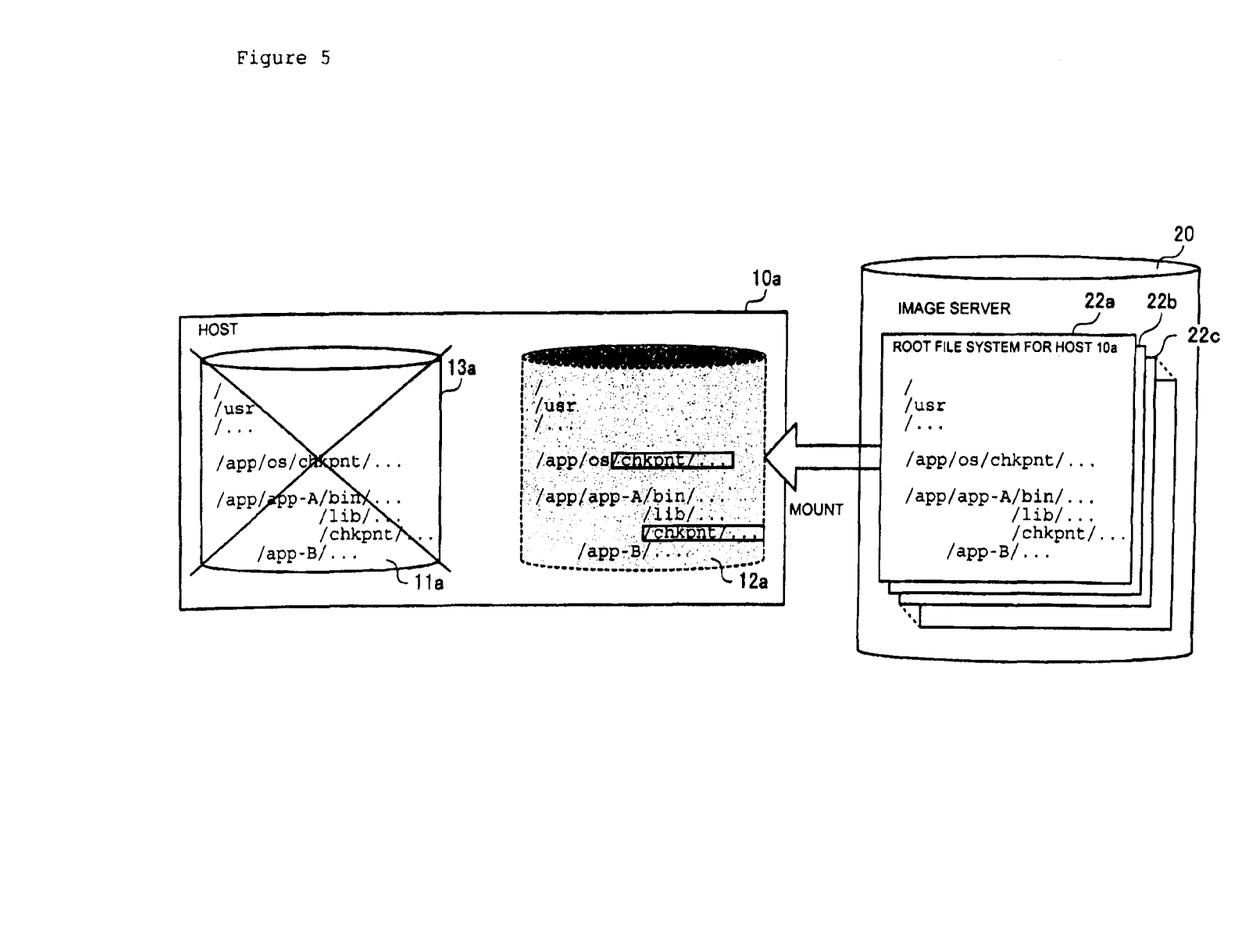
FIG. 5 is a view schematically illustrating the operation of the host in a remote disk operation mode according to the present embodiment of the present invention.

FIG. 5 is a view schematically illustrating the operation in this mode. Actually, multiple hosts 10 are connected to the image server 20, but in FIG. 5, of the hosts 10, the host 10*a* is considered.

This mode is one used when a failure occurs in the local disk 13*a* of the host 10*a*. The occurrence of failure in the local disk 13*a* is indicated by affixing the mark "X" to the local disk 13*a*. In such a case, first the host 10*a* is activated using a boot image on the image server 20. Then, the root file system 22*a* on the image server 20 is mounted to construct a virtual root file system 12*a*, so that OS is operated.

During startup of the host 10*a*, the host 10*a* performs, based on recovery policy, recovery by use of check point information saved in the root file system 22*a* on the image server 20. In FIG. 5, the save destination of check point information used to perform recovery is indicated by the rectangular frame. Further, until a new hard disk drive is ready to be used, check point information is saved, based on check point policy, into the mounted root file system 22*a* on the image server 20, for example, at regular intervals.

The above described operation in this mode is summarized as follows.

Firstly, in this mode, the local disk 13*a* cannot be used, but the image server 20 (the root file system image for the host 10a) can be used; and the boot image and root file system are present only in the image server 20. Further, the method of producing check point information is determined based on check point policy, but the output destination of check point information is the image server 20. The method of applying check point information is determined based on recovery policy, but the read source of check point information is the image server 20. Here, the method of producing check point information includes, for example, a list of applications for which check point information is produced, and a timing of producing check point information; and the method of applying check point information includes, for example, the applicability of check point information.

3. Recovery Operation Mode (Schematic Description of Operation)

Figure 6:
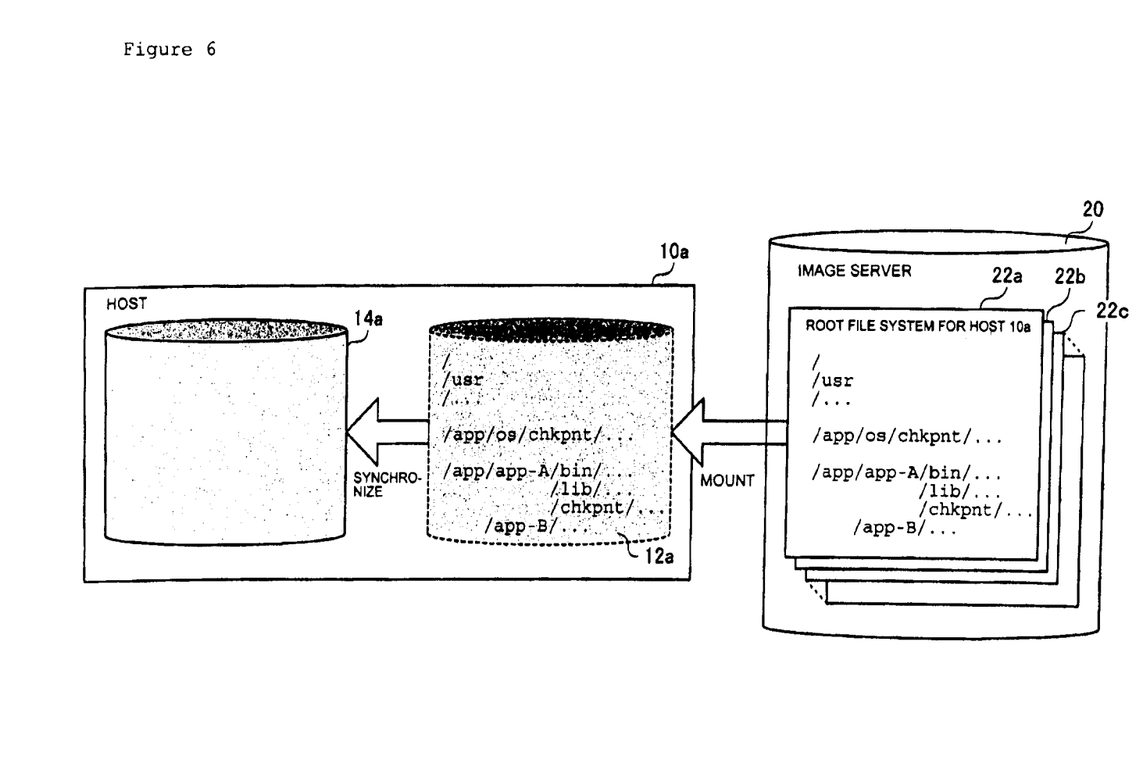
FIG. 6 is a view schematically illustrating the operation of the host in a recovery operation mode according to the present embodiment of the present invention.

FIG. 6 is a view schematically illustrating the operation in this mode. Actually, multiple hosts 10 are connected to the image server 20, but in FIG. 6, of the hosts 10, the host 10a is considered.

This mode is one which is used when a new hard disk drive 14a of the host 10a is ready to be used. Until the new hard disk drive 14a is ready to be used, the host 10a has been operated by mounting the root file system 22a on the image server 20 and thereby constructing the virtual root file system 12a. In this mode, under such condition, the system is recovered using the root file system 22a (the virtual root file system 12a) on the image server 20. In this case, the system is recovered, based on recovery policy, using check point information saved in the root file system 22a on the image server 20. Accordingly, the host 10a changes to a state where the host 10a can return to the ordinary operation mode.

The above described operation in this mode is summarized as follows.

Firstly, in this mode, both the local disk and image server 20 (the root file system image for the host 10a) can be used; and the boot image and root file system are present only in the image server 20. Further, the method of applying check point information is determined based on recovery policy, but the read source of check point information is the image server 20. Here, the method of applying check point information includes, for example, the applicability of check point information.

4. Function Configuration of the Host 10a

Figure 7:
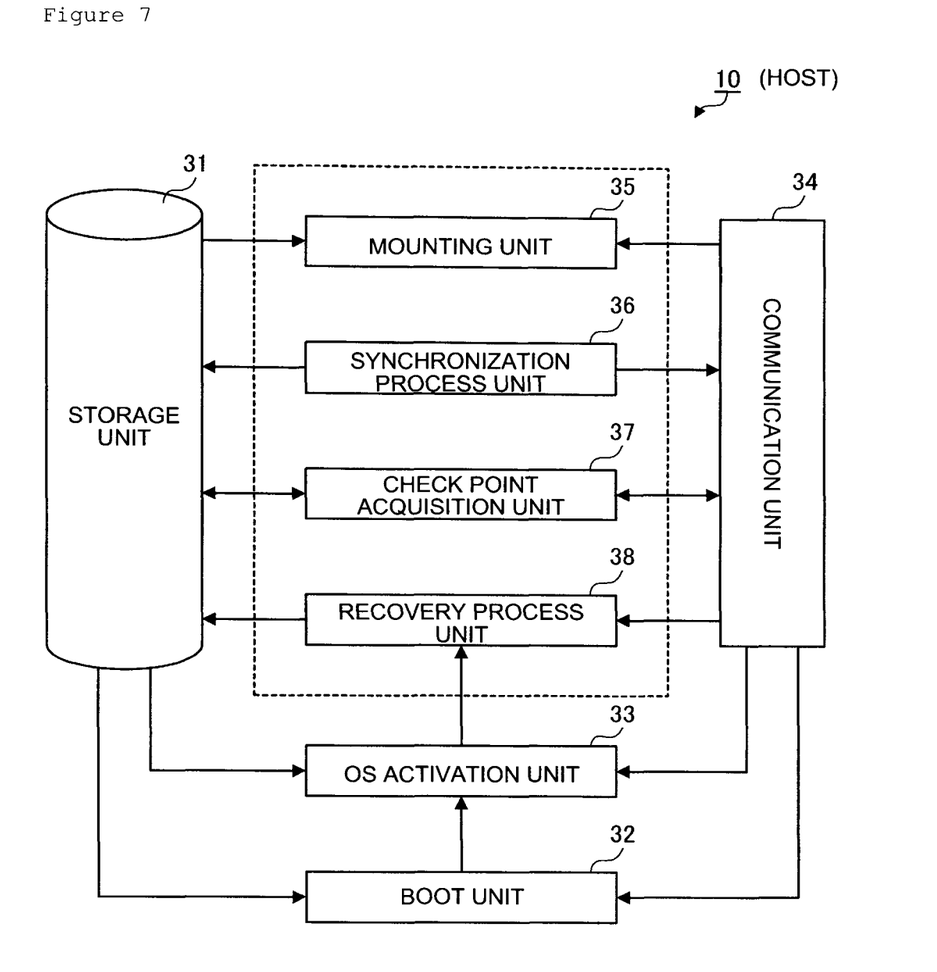
FIG. 7 is a block diagram illustrating an exemplary function configuration of the host according to the present embodiment of the present invention.

FIG. 7 is a block diagram illustrating an exemplary function configuration of a host 10.

As illustrated in FIG. 7, the host 10 includes a storage unit 31, boot unit 32, OS activation unit 33, communication unit 34, mounting unit 35, synchronization process unit 36, check point acquisition unit 37 and recovery process unit 38.

The storage unit 31 is implemented using, for example, a magnetic disk and stores a boot image and root file system. This storage unit 31 corresponds to the local disk described in the above sections 1 to 3 and will be described as a local disk 13 in the following sections 5 and 6.

The boot unit 32 performs boot operations based on a boot image stored in the storage unit 31 or a boot image downloaded from the image server 20 by the communication unit 34.

The OS activation unit 33 mounts a root file system constructed on the storage unit 31 or mounts via the communication unit 34, a root file system constructed on the image server 20 and thereby activates OS.

The communication unit 34 sends/receives information to/from the image server 20. Here, the information sent/received by the communication unit 34 includes boot image, information on root file system, check point information, check point policy and recovery policy.

The mounting unit 35 mounts a root file system on the image server 20 or the storage unit 31 newly prepared.

The synchronization process unit 36 synchronizes a root file system on the storage unit 31 with a root file system on the image server 20. Here, the synchronizing process includes, for example, a process of reflecting updating of the root file system on the storage unit 31 on the root file system on the image server 20, and a process of discarding updating of the root file system on the storage unit 31.

The check point acquisition unit 37 acquires based on check point policy, check point information for application, and outputs the check point information to the storage unit 31, or outputs the check point information via the communication unit 34 to the image server 20. According to the present embodiment, as an exemplary output unit which outputs state information, there is provided the check point acquisition unit 37.

The recovery process unit 38 constructs based on a root file system on the image server 20, a root file system in the storage unit 31. That is, according to the present embodiment, as an exemplary construction unit which constructs a primary root file system, there is provided the recovery process unit 38. Also, based on recovery policy, the pre-failure state of an application is restored. That is, according to the present embodiment, as an exemplary restoring unit which restores the operating state, there is provided the recovery process unit 38.

Of the above described constituent elements, the mounting unit 35, synchronization process unit 36, check point acquisition unit 37 and recovery process unit 38 are functions implemented by OS activated by the OS activation unit 33.

5. Ordinary Operation Mode (Detailed Description of Operation)

Figure 8:
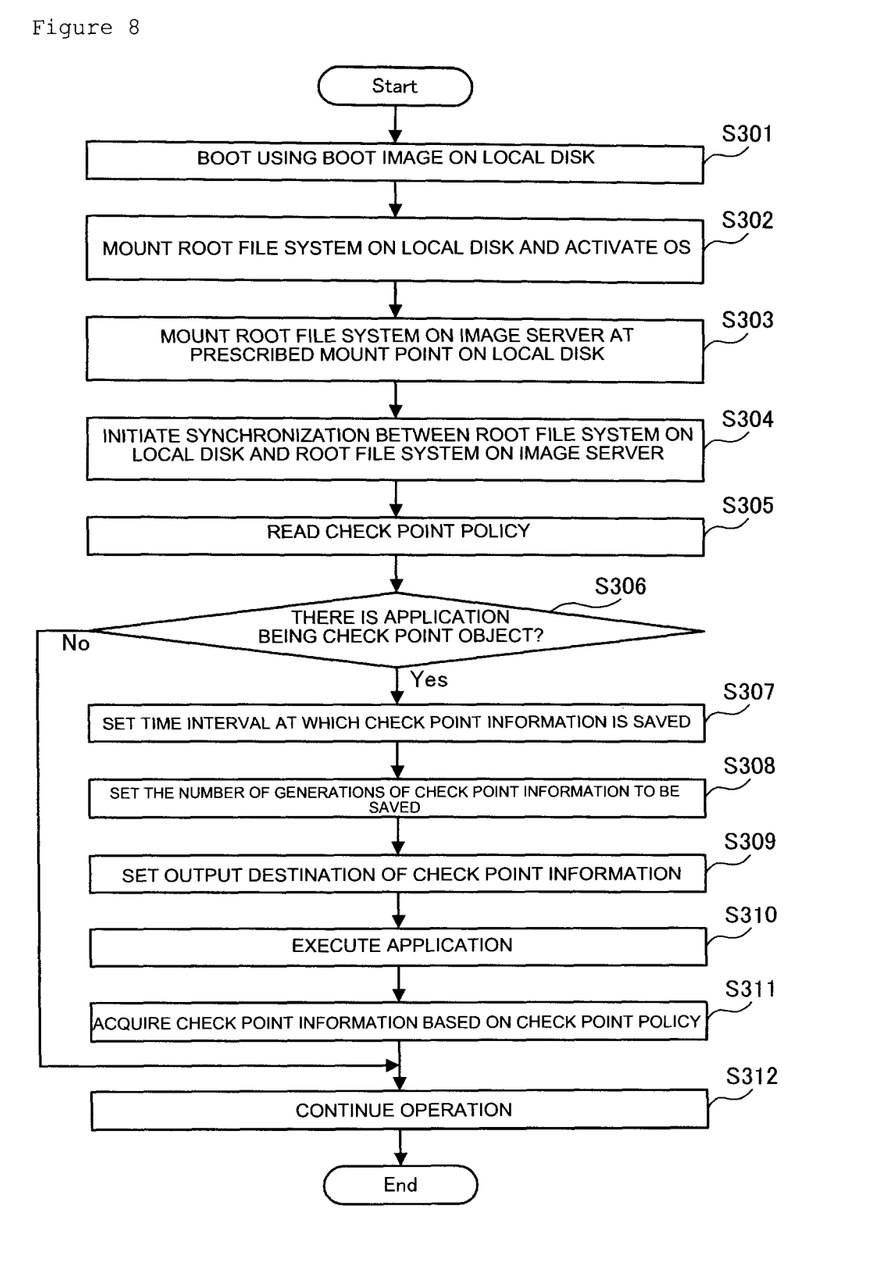
FIG. 8 is a flowchart illustrating in detail the operation of the host in the ordinary operation mode according to the present embodiment of the present invention.

FIG. 8 is a flowchart illustrating in detail the operation in this mode.

Upon power-on of the host 10, the boot unit 32 executes local disk boot using a boot image on the local disk 13 (step 301). Which boot image to use for boot upon power-on of the host may be preliminarily set, for example, in BIOS.

Subsequently, the OS activation unit 33 mounts a root file system on the local disk 13 and thereby activates OS (step 302). As a result, the functions of the mounting unit 35, synchronization process unit 36, check point acquisition unit 37 and recovery process unit 38 are implemented.

Thereafter, the mounting unit 35 receives via the communication unit 34, information on root file system on the image server 20, and mounts this root file system at a prescribed mount point on the local disk 13 (step 303). In this case, which root file system on the image server 20 to mount may be determined based on a setting file in the local disk 13. Also, as a specific mounting method, for example, a directory "/mount" may be prepared under root (/), so that root (/) in the root file system on the image server 20 is mounted in this directory.

Then, synchronization between the root file system on the local disk 13 and the root file system on the image server 20 is initiated (step 304). For example, the synchronization process unit 36 detects updating of root file system on the local disk 13 and sends the detected updating via the communication unit 34 to the image server 20. Alternatively, the updating of root file system on the local disk 13 may be discarded.

The check point acquisition unit 37 reads check point policy via the communication unit 34 (step 305). Here, any of the local disk 13 and image server 20 may be the read source of check point policy. Then, it is determined whether or not there is an application for which check point information is to be saved, in the check point policy (step 306).

If it is determined that there is no application for which check point information is to be saved, the host 10 continues the operation as it is (step 312).

Meanwhile, if it is determined that there is an application for which check point information is to be saved, the check point acquisition unit 37 sets an interval of acquiring check point information (step 307), and sets the number of generations of check point information to be saved (step 308), and sets an output destination of check point information (step 309). In this state, when a user instruction or the like is given, the application is executed (step 310), and acquisition of check point information is initiated (step 311). And the host 10 continues the operation (step 312).

6. Remote Disk Operation Mode (Detailed Description of Operation)

Figure 9:
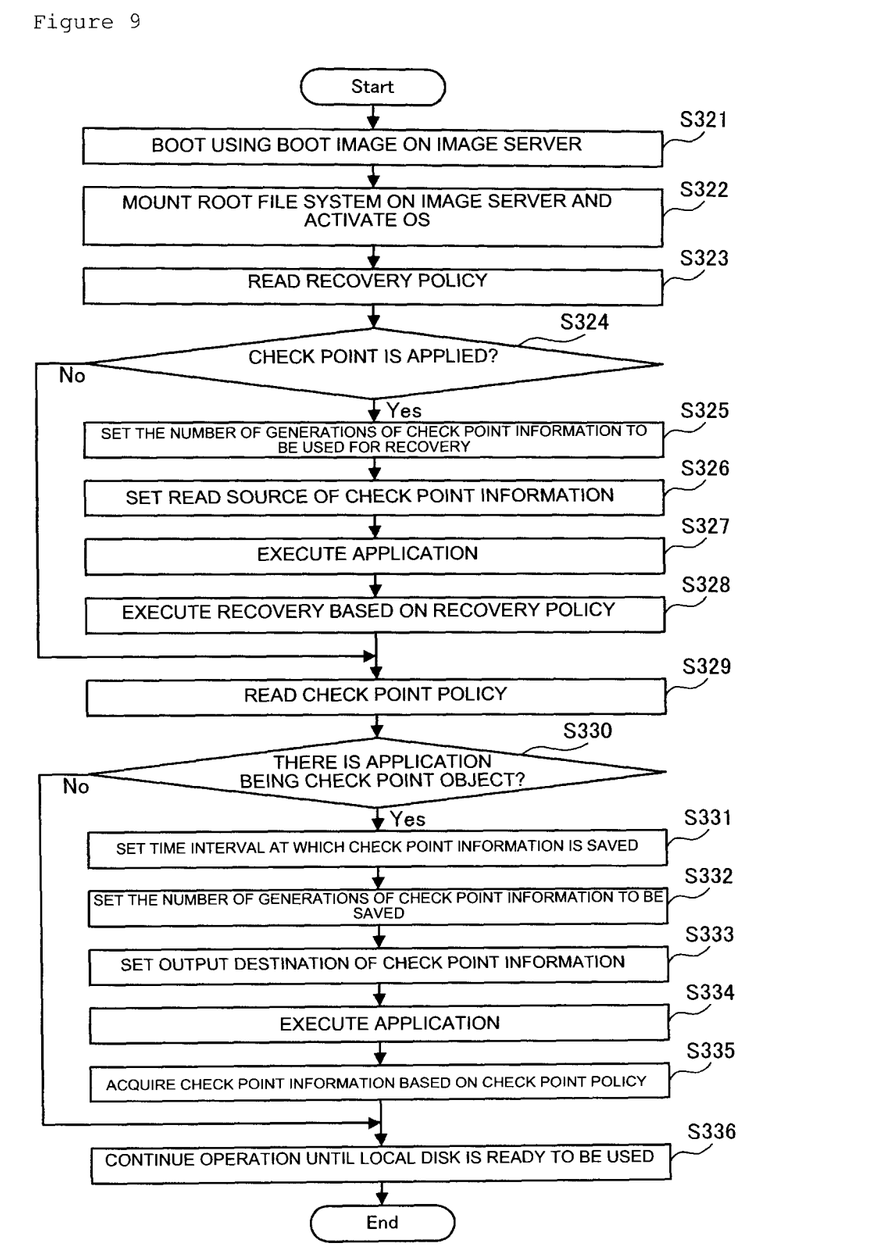
FIG. 9 is a flowchart illustrating in detail the operation of the host in the remote disk operation mode according to the present embodiment of the present invention.

FIG. 9 is a flowchart illustrating in detail the operation in this mode.

Upon power-on of the host 10, the boot unit 32 downloads a boot image via the communication unit 34 from the image server 20 to execute network boot (step 321). Which boot image to use for boot upon power-on of the host may be preliminarily set, for example, in BIOS.

Subsequently, the OS activation unit 33 mounts via the communication unit 34 a root file system on the image server 20 and thereby activates OS (step 322). In this case, which root file system on the image server 20 to mount may be determined based on information attached to the boot image. As a result, the functions of the mounting unit 35, synchronization process unit 36, check point acquisition unit 37 and recovery process unit 38 are implemented.

Thereafter, the recovery process unit 38 reads via the communication unit 34 a recovery policy on the image server 20 (step 323). And it is determined whether or not the need to apply check point information has been described (step 324).

Here, if it is determined that the need to apply check point information has not been described, the operation proceeds to a check point information acquisition process of step 329 and subsequent steps.

Meanwhile, if it is determined that the need to apply check point information has been described, the recovery process unit 38 sets a specific generation of check point information before the current generation to be used for recovery operation (step 325), and sets a read source of check point information (step 326). In this state, when a user instruction or the like is given, the application for which the check point information has been saved is executed (step 327), and the recovery operation is executed based on the recovery policy from the saved check point information (step 328).

The check point acquisition unit 37 reads via the communication unit 34 a check point policy on the image server 20 (step 329), and determines whether or not there is an application for which check point information is to be saved, in the check point policy (step 330).

Here, if it is determined that there is no application for which check point information is to be saved, the host 10 continues the operation as it is until the local disk 13 is ready to be used (step 336).

Meanwhile, if it is determined that there is an application for which check point information is to be saved, the check point acquisition unit 37 sets an interval of acquiring check point information (step 331), and sets the number of generations of check point information to be saved (step 332), and sets an output destination of check point information (step 333). In this state, when a user instruction or the like is given, the application is executed (step 334), and the acquisition of check point information is initiated (step 335). Then, the host 10 continues the operation until the local disk 13 is ready to be used (step 336).

Referring to the flowchart, the application is executed in step 334. However, when the application has already been executed in step 327, the application does not need to be executed again; check point information can be acquired from the application currently executed.

7. Recovery Operation Mode (Detailed Description of Operation)

Figure 10:
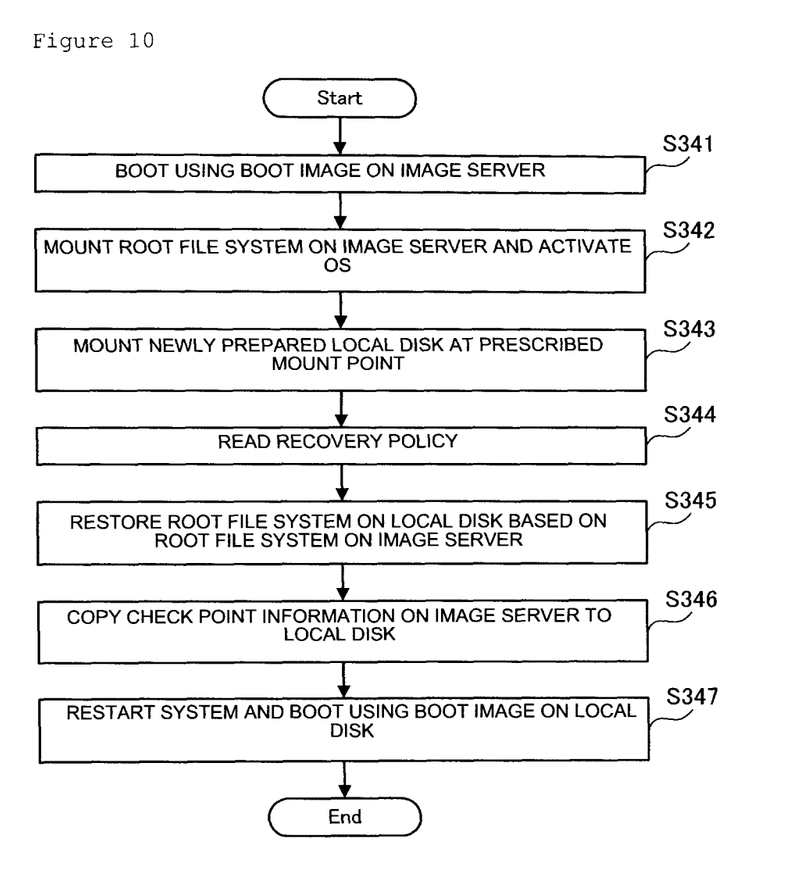
FIG. 10 is a flowchart illustrating in detail the operation of the host in the recovery operation mode according to the present embodiment of the present invention.

FIG. 10 is a flowchart illustrating in detail the operation in this mode.

Upon power-on of the host 10, the boot unit 32 downloads a boot image via the communication unit 34 from the image server 20 to execute network boot (step 341). Which boot image to use for boot upon power-on of the host may be preliminarily set, for example, in BIOS.

Subsequently, the OS activation unit 33 mounts via the communication unit 34 a root file system on the image server 20 and thereby activates OS (step 342). As a result, the functions of the mounting unit 35, synchronization process unit 36, check point acquisition unit 37 and recovery process unit 38 are implemented.

Thereafter, the mounting unit 35 mounts a newly prepared local disk 13 at a prescribed mount point (step 343). Here, as a specific mounting method, for example, a directory "/mount" may be prepared under root (/), so that the newly prepared local disk 13 is mounted in this directory.

The recovery process unit 38 reads via the communication unit 34 a recovery policy on the image server 20 (step 344). Then, based on a root file system on the image server 20, a recovery operation of the root file system on the local disk 13 is performed (step 345), and the check point information on the image server 20 is copied onto the local disk 13 (step 346). Finally, the boot unit 32 restarts the system and performs boot operations based on the boot image copied onto the local disk 13 in step 346 (step 347).

As a result, the host 10 can start in the ordinary operation mode.

The present embodiment was described in detail above.

In the above description, the check point information (halfway state) of application is saved into the local disk 13 or image server 20. However, the information to be saved is not limited thereto. For example, the check point information of OS may be saved. Alternatively, setting information of OS and the like (CPU register, memory, temporary file and the like) may be saved. That is, according to the present embodiment, state information indicating the operating state of the computer is saved on the local disk 13 or image server 20.

Figure 11:
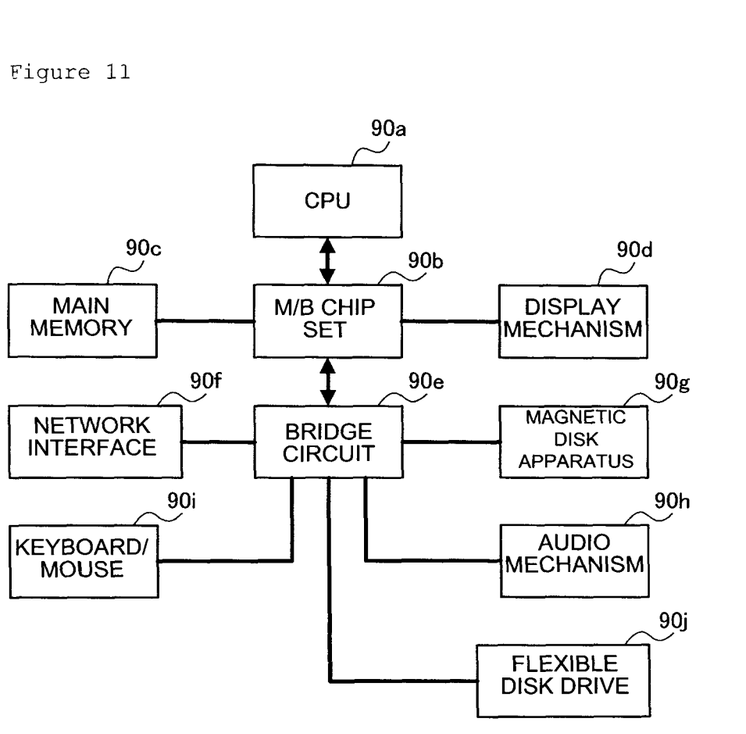
FIG. 11 is a view illustrating a hardware configuration of a computer to which the present embodiment of the present invention can be applied.

Finally, a preferred computer hardware configuration to which the present embodiment is to be applied will be described. FIG. 11 is a view illustrating an example of such a computer hardware configuration. As illustrated in FIG. 11, the computer includes a CPU (Central Processing Unit) being an arithmetic unit 90a, a main memory 90c connected via an M/B (Mother Board) chip set 90b to the CPU 90a, and a display mechanism 90d connected via the M/B chip set 90b to the CPU 90a. A network interface 90f, magnetic disk apparatus (HDD) 90g, audio mechanism 90h, keyboard/mouse 90i and flexible disk drive 90j are also connected via a bridge circuit 90e to the M/B chip set 90b.

Referring to FIG. 11, the constituent components are connected via a bus. For example, the connection between the CPU 90a and M/B chip set 90b, and the connection between the M/B chip set 90b and main memory 90c are made via a CPU bus. The connection between the M/B chip set 90b and display mechanism 90d may be made via an AGP (Accelerated Graphics Port), but when the display mechanism 90d includes a video card compatible with PCI Express, the connection between the M/B chip set 90b and this video card is made via a PCI Express (PCIe) bus. In making connection with the bridge circuit 90e, for the network interface 90f, PCI Express can be used, for example; for the magnetic disk apparatus 90g, serial ATA (AT Attachment), parallel transfer ATA or PCI (Peripheral Components Interconnect) can be used, for example; for the keyboard/mouse 90i and flexible disk drive 90j, USB (Universal Serial Bus) can be used.

Here, the present invention may be implemented totally by hardware or software. Alternatively, the present invention may be implemented by a combination of hardware and software. Further, the present invention may be implemented as a computer, data processing system or computer program. The computer program is stored in a computer-readable medium so that the program can be provided. As the medium, there can be used an electrical, magnetic, optical, electromagnetic, infrared or semiconductor system (apparatus or device), or transmission medium. Examples of the computer-readable medium include semiconductor, solid state storage apparatus, magnetic tape, removable computer diskette, random access memory (RAM), read-only-memory (ROM), rigid magnetic disk and optical disk. Examples of the currently used optical disk include a compact disk read-only-memory (CD-ROM), compact disk read/write (CD-R/W) and DVD.

The present invention was described above with reference to the embodiments, but the technical scope of the present invention is not limited to the embodiment described above. Those skilled in the art will recognize that many changes and modifications to the embodiment are possible without departing from the spirit and scope of the invention.

What is claimed is:

1. A system of managing a root file system used to operate a computer, the system comprising:
   a client having a primary root file system that is constructed on a local disk of said client before operation of said system and operates the client in said local disk; and
   a server having a secondary root file system that resides on said server and operates the client when a failure occurs in the local disk, said secondary root file system being remotely mounted in said client during operation to construct a virtual root file system,
   wherein when the primary root file system is varied, the client synchronizes contents of a varied part of the primary root file system with contents of a corresponding part of the secondary root file system such that contents of the secondary root file system are updated to be consistent with contents of the primary root file system.

2. The system according to claim 1, wherein when a failure occurs in the local disk, based on the secondary root file system provided in the server, the client constructs the primary root file system on another local disk where no failure has occurred.

3. The system according to claim 1, wherein the client outputs state information, indicating operating state of the client, to the primary and secondary root file systems.

4. The system according to claim 3, wherein the state information includes check point information indicating the operating state of at least one of an operating system and an application running in the client, and wherein the client outputs the check point information based on a check point policy which defines at least one of a check point information acquisition source, an acquisition time, number of versions to be outputted, and an output destination.

5. The system according to claim 3, wherein when the client operates using the secondary root file system as a result of occurrence of a failure in the local disk, the client restores the pre-failure operating state based on the state information outputted into the secondary root file system.

6. The system according to claim 5, wherein the state information includes check point information indicating the operating state of at least one of the operating system and application running in the client, and wherein the client restores the pre-failure operating state based on a recovery policy which defines at least one of the applicability of the check point information, a version to be applied and a read source.

7. A computer comprising:
   a storage unit upon which a primary root file system is constructed that operates the computer;
   a mounting unit which mounts a secondary root file system to construct a virtual root file system in said storage unit during operation, the secondary root file system operates the computer, when a failure occurs in the storage unit, from another computer having the secondary root file system; and
   a synchronization process unit which, upon the primary root file system being varied, synchronizes contents of a varied part of the primary root file system with contents of a corresponding part of the secondary root file system mounted by the mounting unit such that contents of the secondary root file system reflect changes in contents of the primary root file system.

8. The computer according to claim 7, further comprising a constructing unit which, upon occurrence of a failure in the storage unit, constructs the primary root file system on another storage unit where no failure has occurred, based on the secondary root file system provided in the another computer.

9. The computer according to claim 7, further comprising an output unit which outputs state information indicating operating state of the computer into the primary root file system and the secondary root file system.

10. The computer according to claim 9, further comprising a restore unit which, when the computer operates using the secondary root file system as a result of occurrence of a failure in the storage unit, restores a pre-failure operating state based on state information outputted into the secondary root file system.

11. A method for managing a root file system comprising:
   operating a client by use of a primary root file system constructed in a local disk of the client;
   mounting a secondary root file system in the local disk to construct a virtual root file system during operation and operating the client when a failure occurs in the local disk from a server having the secondary root file system; and
   synchronizing contents of a varied part of the primary root file system, upon the primary root file system being varied, to be reflected in contents of a corresponding part of the mounted secondary root file system.

* * * * *